United States Patent [19]

Blair

[11] Patent Number: 6,018,400
[45] Date of Patent: Jan. 25, 2000

[54] LASER PRINTER EMPLOYING OVERLAPPED COLOR PLANE PROCESSING

[75] Inventor: Timothy P. Blair, Boise, Id.

[73] Assignee: Hewlett-Packard Company, Palo Alto, Calif.

[21] Appl. No.: 09/073,302

[22] Filed: May 5, 1998

[51] Int. Cl.[7] ........................................... G06F 15/00
[52] U.S. Cl. .................................. 358/1.9; 358/1.17
[58] Field of Search ................... 358/1.01, 1.09, 358/1.11, 1.14, 1.15, 1.17, 500, 515, 530, 407, 448, 488; 709/100, 102, 103, 104, 105, 107, 201, 213; 710/20, 21, 204; 382/162, 164, 165, 276, 277; 347/111, 115, 116, 171, 172

[56] References Cited

U.S. PATENT DOCUMENTS

| | | | |
|---|---|---|---|
| 5,129,049 | 7/1992 | Cuzzo et al. | 395/113 |
| 5,479,587 | 12/1995 | Campbell et al. | 395/116 |
| 5,524,186 | 6/1996 | Campbell | 395/115 |
| 5,781,707 | 7/1998 | Kunz et al. | 395/105 |
| 5,805,174 | 9/1998 | Ramchandran | 345/501 |
| 5,850,504 | 12/1998 | Cooper et al. | 395/101 |
| 5,915,075 | 6/1999 | Kadowaki | 395/109 |
| 5,915,079 | 6/1999 | Vondran, Jr. et al. | 395/114 |

*Primary Examiner*—Dov Popvici
*Assistant Examiner*—Gabriel I. Garcia

[57] ABSTRACT

The method of the invention controls a printer to overlap the processing of color plane image data and assures that there is no interruption between the processing of color planes. More specifically, the method of the invention provides a pair of queues, an imaging queue (IQ) wherein page strips are listed prior to being rasterized and a print engine queue (EQ) wherein page strips are listed after being rasterized. A first parameter identifies the color plane of page strips of a first color plane listed on the IQ and is associated with each of the page strips. A second parameter identifies the color plane of page strips that are being listed on the EQ after being rasterized. If the second parameter indicates that page strips of an earlier color plane are being passed to the EQ while the first parameter indicates that a page strip of a later color plane are being passed to the rasterizer, the page strips exiting from the rasterizer are listed on a work ahead queue (WAQ) instead of being listed on the EQ. When the parameters thereafter indicate the same color plane, the WAQ becomes the EQ and the process continues with the page strips in accordance with data in a next color plane.

8 Claims, 4 Drawing Sheets

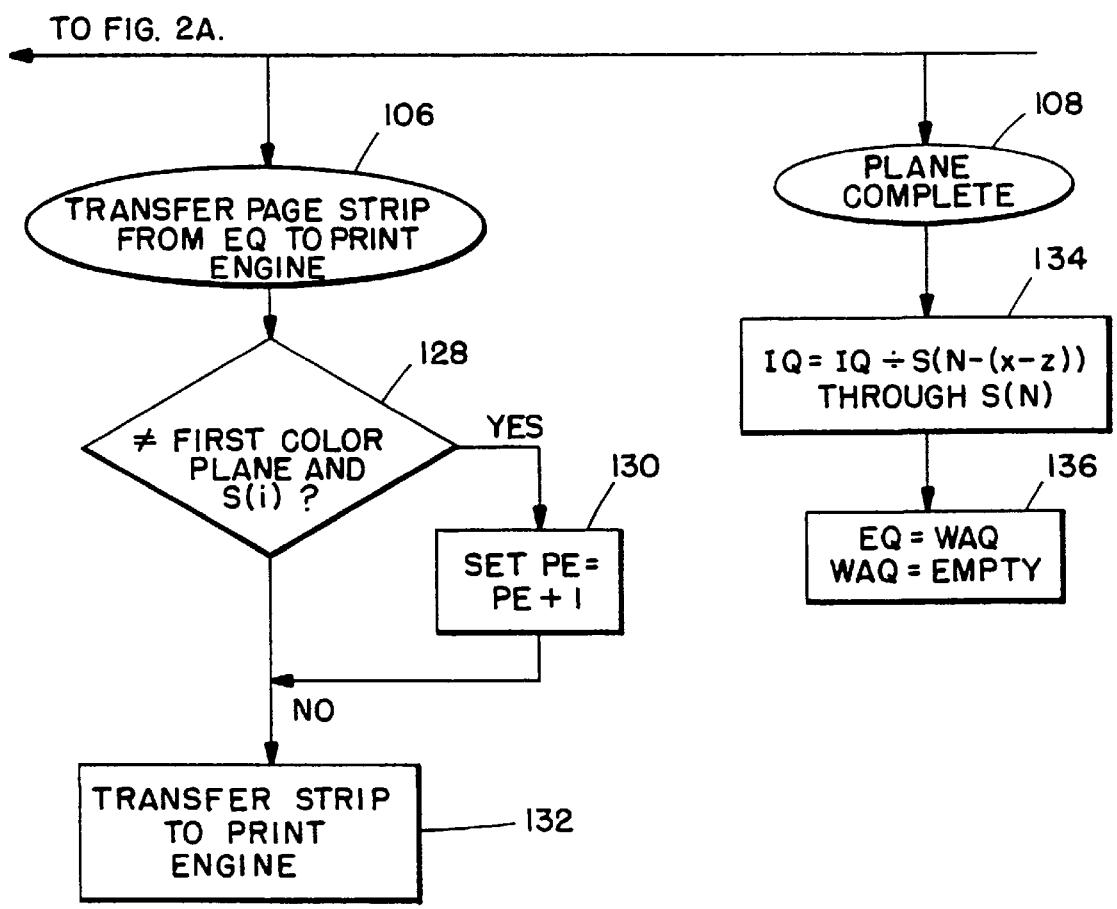

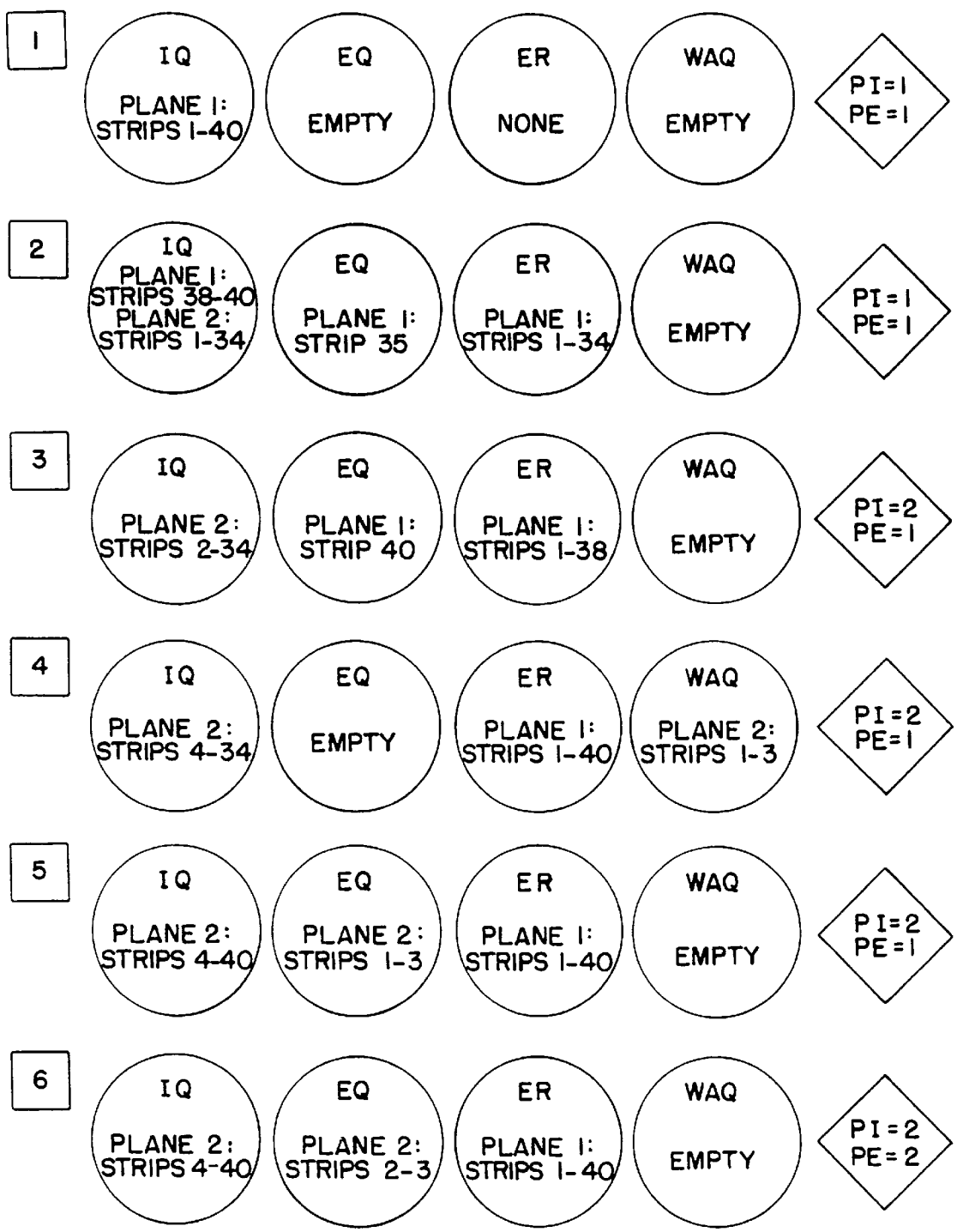

LASER PRINTER EMPLOYING OVERLAPPED COLOR PLANE PROCESSING

FIELD OF THE INVENTION

This invention relates to page printers and, more particularly, to a laser page printer which is adapted to partially overlap the processing of individual color planes which comprise an image to be rendered onto a media sheet.

BACKGROUND OF THE INVENTION

Certain versions of multi-color printers employ a print engine to which print data is supplied in a "race" mode. In such printers, the print engine operates at a constant speed and rasterized image data is made available at a rate which keeps up with the engine's operation. To accomplish such operation, prior art printers have caused a host processor to download an already rasterized bitmap of the page to be printed. Of course, this consumed large amounts of memory and, with the advent of color, became prohibitively expensive in terms of memory requirements.

Most color laser printers today receive an image of a page to be printed in the form of a page description language (such as PCL or PostScript) and construct a page description which is then fed to the print engine for rendering onto a media sheet. More precisely, a page description is built in two steps. During formatting, the page description language is converted into a series of commands, called display commands which describe what must be printed. Further, the display commands are sorted according to their vertical position on the page and are placed into "page strips". Each page strip is then listed on a "display list". Thereafter, each page strip is extracted from the display list and is converted into a rasterized pixel image at a fast enough pace to maintain a constant flow of rasterized data to the print engine (which is operating in the "race" mode).

To conserve memory, the laser printer is provided with a plurality of raster buffers, with each buffer having sufficient capacity to handle the rasterized form of a page strip. Each buffer is reused as it's rasterized data is fed to the print engine and is rendered onto the media sheet.

In monochrome printers, each page to be printed is configured in the form of a separate display list that are sequentially numbered and are then sequentially accessed for rendering into rasterized form. In such printers, page pipelining has been utilized wherein processing of the display list for a subsequent page is commenced, even before a preceding page has been totally printed. However, with color laser printers, multiple color planes make up each page. For example, a single page of print data will most often utilize four color planes, magenta (M), cyan (C), yellow (Y) and black (K). A single display list is utilized for each page and each object entry in the display list includes sub-entries which define how that object is to be rendered within each of the four color planes. Accordingly, the laser color printer sends the same display list, multiple times, through the image processing procedure, each time a single color raster image being created, with the object present therein rendered in accord with the command data associated therewith. Thus, the display list for each page strip is "run" (i.e., translated to raster data) and the resultant rasterized image sent to the print engine. The same operation is repeated for each subsequent color plane.

For efficient operation, pipelining of color planes is desirable, i.e., processing the data from a second color plane while the first color plane is being fed to the print engine. However, because the same display list incorporates data for plural color planes and is run for each color plane, processing problems occur that have not heretofore been encountered in monochrome laser printers.

An example will illustrate the problems that are encountered. Assume that the page is configured in the form of 40 page strips and that each color plane is of identical size. Assume further that three strip memory buffers are employed and that the following processing queues are utilized: an imaging queue (IQ) of page strips that need to be rasterized; an engine queue (EQ) for strips that have been rasterized and are ready to be passed to the print engine; and a work-ahead queue (WAQ) which contains page strips that have been rasterized, but for which the print engine is not yet ready. Further assume that as soon as only three page strips are left on the IQ that the next plane or page to be sent to the engine is determined and its page strips are listed at the end of the IQ (after the remaining three strips of the previous color plane/page).

For the case of a four color plane (CMYK) page, further assume the following conditions:

1. Page strips 1–37 have been removed from the IQ and sent to be rasterized for plane 1;
2. Planes 1–34 have been returned from being rasterized; have passed through EQ and been sent to the print engine for rendering.

At this point, page strips 38–40 remain on the IQ and page strips 1–34 of plane 2 are added to the IQ. Now page strips 38–40 for plane 1 are sent to be rasterized, and strip 38 is passed through the EQ, sent to the engine and is returned. Next, page strip 1 for plane 2 is sent to be imaged (because: (i) the strip buffer for strip 38 is released and made available, (ii) strips 39 and 40 already have the remaining two strip buffers assigned and (iii) there are no further strips from plane 1 to be processed).

Therefore, since only three strip buffers are available, page strips 1–3 for plane 2 will have been imaged before the print engine acknowledges completion of the printing of plane 1. This results in page strips 1–3 for plane 2 being placed on the WAQ, after being rasterized. Once the print engine acknowledges completion of printing of plane 1, page strips 1–3 of plane 2 are removed from the WAQ and are placed on the EQ, to await transfer to the print engine. The processing of the remaining strips for plane 2 proceeds as aforedescribed.

While the above description assumes that the timings of when page strips return from being imaged; return from the print engine; and the print engine acknowledges completion of printing for a plane, are completely deterministic and repeatable, such timings are not. The complexity of objects that are contained within a page strip, changes the amount of time required to rasterize the page strip. Further, changes in rasterization time affect how soon a strip is sent to the print engine and therefore when the page strip is returned. Accordingly, such timings are non-deterministic.

However, some operations within a laser printer are extremely critical and timing dependent. Before a page strip is rasterized, the plane to be rasterized must be placed on the display list, and when a page strip returns from being imaged, a determination must be made whether to place it on the EQ or the WAQ. The variations in timing of event occurrence resulting from the differences in page strip complexity make control of the placement of page strips on the aforesaid queues highly complex.

Accordingly, it is an object of this invention to provide an improved method and means for controlling page strips as they are moved between queues during a page rendering operation.

It is another object of this invention to enable a page strip listed on a display list to be passed to a rasterizer in a manner which is asynchronous with the time a page strip, after rasterization, is placed on either an EQ or a WAQ, to await passage to a print engine.

SUMMARY OF THE INVENTION

The method of the invention controls a printer to overlap the processing of color plane image data and assures that there is no interruption between the processing of color planes. More specifically, the method of the invention provides a pair of queues, an imaging queue (IQ) wherein page strips are listed prior to being rasterized and a print engine queue (EQ) wherein page strips are listed after being rasterized. A first parameter identifies the color plane of page strips of a first color plane listed on the IQ. A second parameter identifies the color plane of page strips that are being listed on the EQ after being rasterized. If the second parameter indicates that page strips of an earlier color plane are being passed to the EQ while the first parameter indicates that a page strip of a later color plane are being passed to the rasterizer, the page strips exiting from the rasterizer are listed on a work ahead queue (WAQ) instead of being listed on the EQ. When the parameters thereafter indicate the same color plane, the WAQ becomes the EQ and the process continues with the page strips in accordance with data in a next color plane.

The invention thus enables asynchronous control of the work ahead action and avoids the need for synchronization between page strips being rasterized and page strips being transferred, after rasterization.

BRIEF DESCRIPTION OF THE DRAWINGS

FIGS. 2a and 2b illustrate a logical flow diagram of the method of the invention.

FIG. 3 illustrates a state diagram useful for understanding the method of the invention.

DETAILED DESCRIPTION OF THE INVENTION

Figure 1:
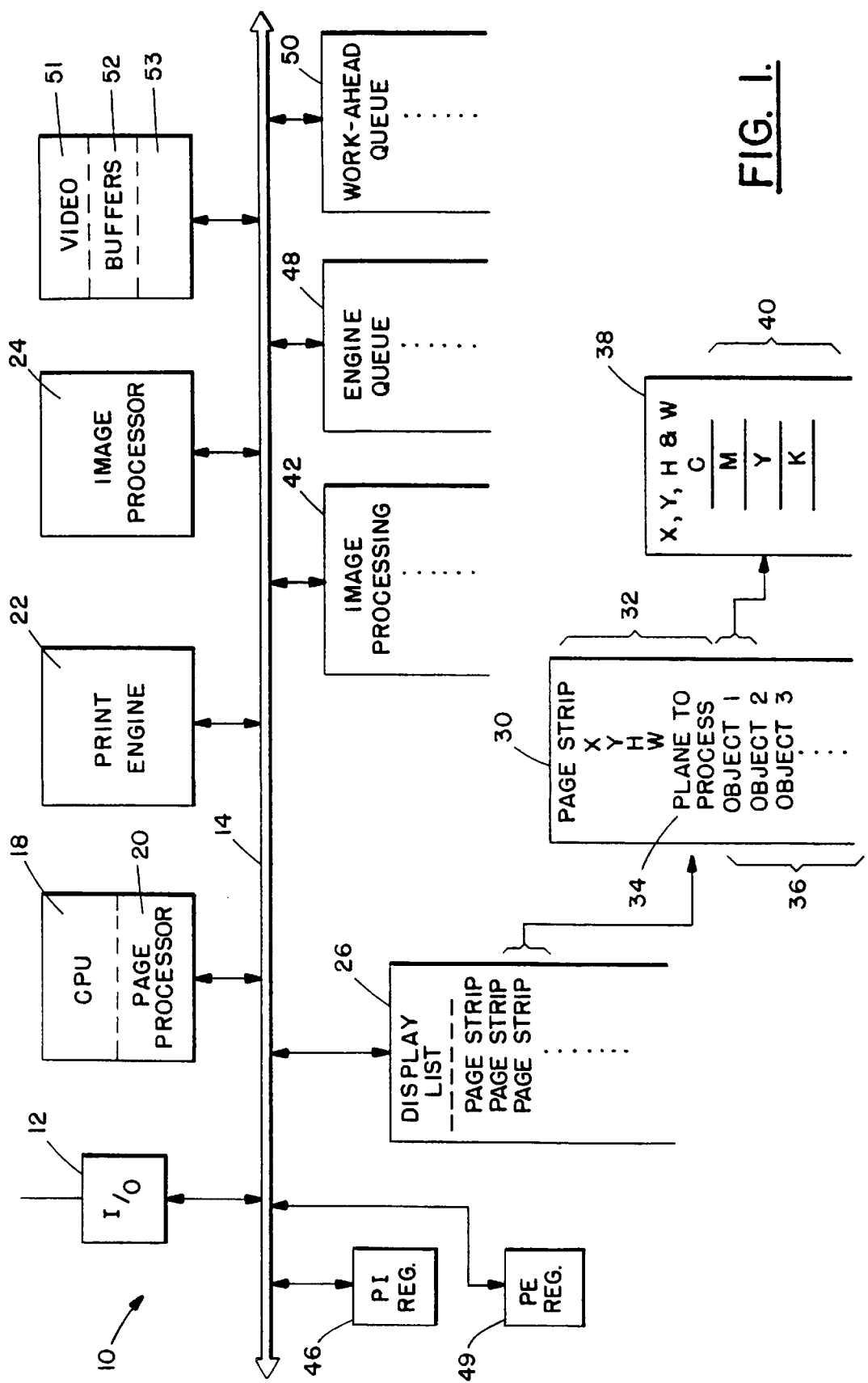
FIG. 1 is a block diagram indicating a printer system (and data structures) particularly adapted to carrying out the invention.

Referring to FIG. 1, a printer 10 receives input page description information from a host processor via an input/output (I/O) module 12, which information is fed via a bus system 14 and is stored in memory. A central processing unit (CPU) 18 controls overall operation of printer 10 and includes a page processor procedure 20 which, in conjunction with the remaining elements of printer 10, controls conversion of the page description language to rasterized data that is suitable for transfer to a print engine 22. Printer 10 further includes an image processing module 24 which converts an intermediate form of page image data to a rasterized image data that is suitable for rendering by print engine 22.

Under control of page processor 20, the page description language from memory 16 is converted to a display list 26. Display list 26, in essence, comprises a plurality of page strips of page intermediate data which, together, define the images to be placed on the media sheet being processed by print engine 22. It will be assumed, for exemplary purposes only, that each page is segmented into 40 page strips (i.e., "N"), with each listed on display list 26. Each page strip 30 includes a header 32 which defines the X-coordinate and Y-coordinate of an anchor point of the page strip on the page, and H and W parameters which define the height and width of the page strip. Further, each page strip 30 includes a "plane to process" field 34 which manifests a parameter that denotes which color plane is being processed in accord with the various objects 36 that are present in the page strip.

Each object 36 listed within a page strip includes definitional detail of a particular image to be rendered within the page strip, including its x,y anchor point coordinate, its height and width and color plane data 40 that is to be ascribed to the object during the rendering of each color plane. More specifically, as the C color plane is being rendered, when object 38 is being processed, the C value therefor (if any) is accessed and utilized to create the color data for the object in the rasterized C color plane. As each succeeding color plane is, in turn, processed, the succeeding M, Y and K values (which may vary from 0–255, assuming 8 bit color values) are accessed and utilized to control the respective color plane image data.

As can thus be seen, display list 26 is accessed four times to enable the creation of four color planes for the page strips of a page. Further, each time a page strip is removed from IQ 42 to be rasterized, it's plane to process field 34 is updated to indicate the current color plane being processed and this value, in turn, controls which of the color values 40 are accessed for each object in each page strip 30.

After page processor 20 has created display list 26 for a page, each page strip 30 is ready to be rasterized and passed to print engine 22. At such time, the page strips listed on display list 26 are placed on IQ 42. At this point, a rasterization action is performed by image processing module 24 on the respective page strips listed on IQ 42. As each page strip is extracted from IQ 42, its plane to process field 34 is updated with a parameter PI (i.e., "page being imaged") to indicate the current page whose color plane is being rasterized by image processing module 24. The PI value is maintained in a register 46.

Once a page strip has been rasterized for a current color plane by image processor 24, the page strip is listed on either EQ 48 or WAQ 50, in preparation for transfer to print engine for rendering onto a media sheet. When the page strip returns from rasterization, plane to process field 34 therein is compared to a parameter PE (i.e., "plane being transferred to engine") that identifies the color plane image data manifest by the page strip. The PE value is maintained in register 49. If during the comparison, plane to process field 34 in the page strip includes a parameter value equal to PE, then the page strip is listed on EQ 48. Otherwise, it is listed on WAQ 50.

In the process of rasterizing a page strip, image processor 24 utilizes one of a plurality of video buffers 51, 52 and 53. It is to be understood that three video buffers are shown in FIG. 1 for exemplary purposes only and that any number (i.e., "X") of video buffers may be utilized, if sufficient memory is available. In essence, once a page strip has been rasterized, the rasterized data is stored in a respective video buffer, and control of the video buffer is then transferred to print engine 22 so that its data may be printed. Once the data has been printed from the respective video buffer, the video buffer is assigned for use with a next page strip for rasterization. This action occurs in a round-robin manner.

To prevent interruption between the transfer of rasterized page strips of video data to print engine 22, when all but X-1 page strips have been rasterized in accord with a color plane's data and listed on EQ 48, at least one of video buffers 51, 52 or 53 becomes available for use with a first page strip from a next color plane to be processed. At such time, the page strips that have already been printed (i.e., N-(X-1) of the page srips listed on display list 26) are again listed on IQ 42, after the X-1 page strips from the previous color plane which remain to be rasterized. Assuming only two such page strips (i.e., X-1, where X=3) remain to be rasterized for the current color plane and that they have been assigned video buffers 51 and 52, the first page strip for the next color plane is assigned video buffer 53.

When the first page strip of the next color plane exits from image processing module 24, under control of the PI and PE values, it is listed on WAQ 60 in lieu of its being placed on EQ 48. This action is repeated for the next two page strips from the next color plane and causes their listing on WAQ 50. By contrast the last two page strips (i.e., those assigned video buffers 51 and 52) from the current color plane are listed on EQ 48 and are subsequently passed to print engine 22. As the last page strip from the current color plane is passed from EQ 48 to print engine 22, WAQ 50 becomes EQ 48 and EQ 48 becomes WAQ 50. Accordingly, there is no interruption in handling of rasterized page strips and a work-ahead action is enabled.

As will be understood from the description below, it is the PI and PE parameter values which enable an asynchronous work-ahead action. More specifically, each time a page strip is moved from IQ 42 to image processing module 24, its plane to process field PI parameter is compared with the PE parameter of a page strip listed on EQ 48. If the parameters are the same, (i.e., indicating the same color plane), then the page strip being passed from rasterizing module 24 is listed on EQ 48. If, by contrast, the parameter value in plane to process field 34 differs from the PE value (indicating a different color plane), then the page strip being passed from rasterizing module 24 is listed on WAQ 50. More specifically, the difference in the parameter value in plane to process field 34 and the PE parameter value indicates that the page strip being prepared for transfer to print engine 22 is from a different color plane than the color plane data of the page strip just rasterized. Thus, the page strip from image processing module 24 must be temporarily held in WAQ 60 until all of the rasterized page strips on EQ 48 have been fed to print engine 22. This action enables the strip buffers that are no longer needed for the current color plane to be utilized for the next color plane and to be placed on WAQ 50, to await completion of rendering of the current color plane's page strips. Further, there is no discontinuity in the printing of the page strips.

The control of the PI and PE parameter values is exercised by page processor 20 which maintains a record of which color plane is being processed in from IQ 42 (and how many page strips remain to be processed for a specific color plane) and further maintains a record of how many page strips remain on EQ 48 for a particular color plane. From these counts, it can be determined when to alter both the PI and PE values to indicate which color plane is being processed by image processing module 24 versus which color plane is being transferred to print engine 22.

Figure 2A:
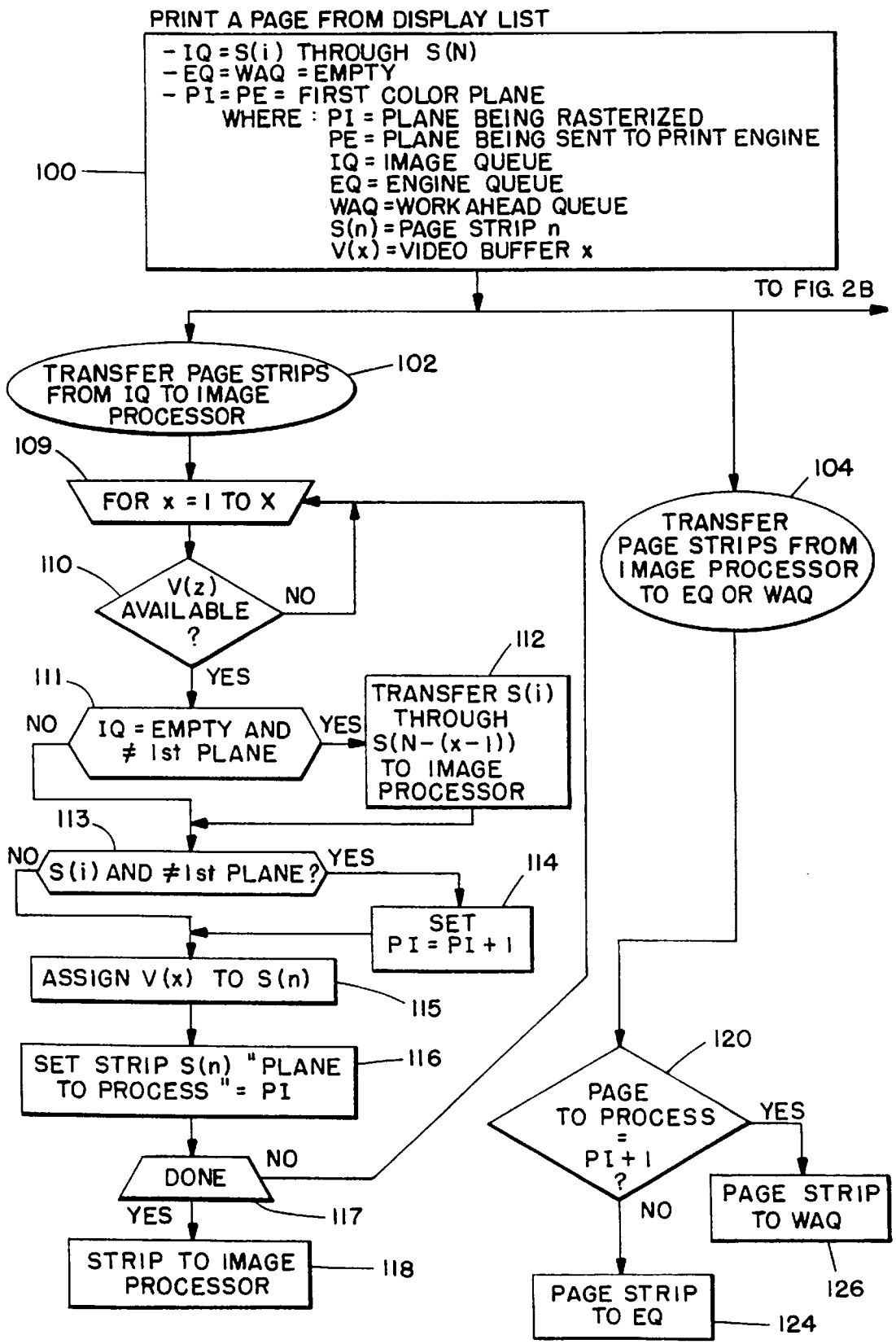

Turning now to FIGS. 2a and 2b, the method of the invention will be described in conjunction with the flow diagram shown therein. At initialization time (step 100), the image queue is loaded with page strips S(l) through S(N) and both EQ 48 and WAQ 50 are empty. Further, PI is set equal to PE which is set equal to the first color plane.

Each of the branches which extend from initialization step 100 indicate sequences of action which occur asynchronously with respect to each other. At the start of a page or when a page strip releases a video buffer after use by print engine 22, branch 102 executes. During branch 102, page strip transfer occurs from IQ 42 to image processing module 24. To implement the transfer, a loop is executed from x=1 to X, with x being the number of a strip buffer and X being the total number of strip buffers (loop step 109). Decision step 110 indicates that if no video buffer is available, the procedure recycles. Otherwise, it moves to decision step 111.

Assuming IQ 42 is not empty and the procedure is working on a first color plane, the procedure cycles down through decision steps 111 and 113 and to step 115 where a video buffer x is assigned to the current page strip S(n). Further, the plane to process field in page strip S(n) is set to the PI parameter value. Thereafter, if video buffers sufficient in size to accomodate the page strip have been assigned (step 117), the the current page strip is passed to image processing module 24. Otherwise the procedure recycles. Thereafter, image processing module 24 rasterizes the page strip.

When a page strip is released from image processor 24, the operation of branch 104 commences. The page strip is passed from image processing module 24 to either EQ 48 or WAQ 50. The movement of the rasterized page strip is dependent upon whether the page strip's plane to process field parameter value (PI)=PE or PE+1. The latter equality indicates that the color plane being rasterized is the one immediately following the color plane being transferred to print engine 22. In such case, the rasterized page strip is listed on WAQ 50 and in the former case, the page strip is listed on EQ 48 (decision step 120 and steps 124, 126).

Thereafter, when print engine 22 requests another page strip, branch 106 executes. In response, page strips are transferred from EQ 48 to print engine 22 (step 106). As each page strip is transferred, it is determined whether the page strip is from other than the first color plane and is the initial strip S(1) from IQ 42, i.e., a new color plane (decision step 128). If yes, the value of PE is incremented to PE+1 (step 130) and the page strip is fed to print engine 22 (step 132). Otherwise (decision step 128), the page strip is fed directly to print engine 22, without incrementing the value of PE.

At plane complete (branch 108), IQ 42 contains the image queue for the next page strip plus the page strips remaining for the current color plane being imaged (i.e., S(N−(X−2)) through S(N)), (step 134). Further, at this stage, (i) EQ 48 becomes WAQ 50, (ii) WAQ 50 becomes EQ 48 and (iii) the new WAQ 50 is empty (step 136).

Returning to branch 102, at decision step 111, if IQ 42 is empty and other than a first color plane is being processed, page strips S(l) through S(N−(X−1)) are transferred to image processing module 24 (step 112). Further, at step 113, if the procedure is at the first strip of a color plane which is other than the first color plane, PI is set to PI+1, indicating that a next color plane is being rasterized.

As shown in branch 104, so long as PI and PE manifest the same value, rasterized page strips are sent to EQ 48, whereas if plane to process field 34 and PE manifest different values, the page strip is sent to WAQ 50 (decision step 120). Further, as shown in decision step 128 (branch 106), the PE value is incremented when a first page strip of a color plane (that is other than the first color plane) is transferred to the print engine. In such manner, the values of plane to proces field 34 and PE enable complete control of the destination of rasterized strips, with the values of PI being controlled to indicate the current color plane being imaged and the value of PE being controlled to indicate the current color plane being transferred to print engine 22.

Turning to FIG. 3, each line in the figure is a snapshot of a state which exists during the processing of a multiple color plane page, by the page processing pipeline. IQ, EQ, WAQ, PI and PE are as described above. The parameter "ER" indicates strips that have returned from print engine 22. Again, a page is assumed to contain 40 page strips and there are assumed to be three strip memory buffers.

When the processing pipeline is started, all of the page strips in the display list are added to the IQ, and PI and PE are initialized to one (State 1).

State 2 in FIG. 3 illustrates the page pipeline state just after the pipeline commences operation. Before the first work ahead operation, page strips 38–40 for plane 1 are still resident in IQ 42, and page strips 1–34 have returned from print engine 22. It is further assumed that page strip 35 has returned from being image processing module 24 and has been placed in EQ 48. Page strips 36 and 37 are still being rasterized. The work ahead operation adds page strips 1–34 for plane 2 to IQ 42.

State 3 in FIG. 3 illustrates the page pipeline state just after the work ahead operation. Before the first page strip for plane 2 is removed from IQ 42, page strips 1–34 for plane 2 are in the IQ 42. It is further assumed that page strip 40 for plane 1 is in 30 EQ 48 and that page strips 1–38 for plane 1 have returned from the engine. The IQ 42 removal operation increments PI, sets the color plane to be imaged in the first page strip for plane 2 and sends the first page strip for color plane 2 to be rasterized.

State 4 in FIG. 3 illustrates the page pipeline state just after the first page strip for color plane 2 has been removed from IQ 42. When print engine 22 signals that a plane is complete, page strips 1–40 for color plane 1 have been returned from print engine 22; page strips 1–3 for color plane 2 have been returned from being rasterized and have been placed on WAQ 50, since PI does not equal PE. Page strips 30 and 34 for color plane 2 are still in the IQ 42.

State 5 illustrates the page pipeline state just before a plane complete signal from print engine 22 is processed. After the engine complete signal is issued, page strips 35–40 for plane 2 have been added to IQ 42, and page strips 1–3 for plane 2 have been moved from WAQ 50 to EQ 48.

State 6 illustrates the page pipeline state just after a plane complete signal from engine 22 is processed. Before the first page strip for color plane 2 is removed from EQ 48, page strips 1–3 for color plane 2 are in EQ 48, page strips 4–40 are in IQ 42 and PE=1. The EQ 48 removal operation increments PE, removes page strip 1 for color plane 2 from the EQ 48 and sends it to the engine.

It should be understood that the foregoing description is only illustrative of the invention. Various alternatives and modifications can be devised by those skilled in the art without departing from the invention. For example, while page processor 20 is shown as already loaded into a memory within CPU 18, it could also be configured on a memory media such as a magnetic disk for subsequent loading into CPU 18. Accordingly, the present invention is intended to embrace all such alternatives, modifications and variances which fall within the scope of the appended claims.

I claim:

1. A method for controlling a printer to overlap the processing of color plane image data, said color plane image data segmented into N page strips that are, in turn, listed on a display list, wherein each page strip entry on said display list includes data defining color(s) to be applied to each object in said each page strip, said printer further having a print engine and X page strip buffers, where X<N, said method comprising the steps of:

a) listing on an imaging queue, said N page strips from said display list, for rasterization in accord with a first color plane data;

b) setting a first parameter to indicate that page strips are being rasterized in accord with first color plane data;

c) rasterizing page strips from said imaging queue in accord with said first color plane data and causing rasterized ones of said page strips to be passed to said print engine;

d) setting a second parameter to indicate that a page strip rasterized in accord with said first color plane data is being passed to said print engine;

e) listing on said imaging queue page strips from said display list for rasterization in accord with a second color plane data and repeating steps c) and d) with respect thereto;

f) when said first parameter and second parameter indicate a different color plane, transferring rasterized ones of said page strips, listed on said imaging queue in step e), to a work ahead queue; and g) causing said work ahead queue to pass rasterized page strips to said print engine when said first parameter and second parameter indicate a same color plane.

2. The method as recited in claim 1, wherein step
d) lists rasterized ones of said page strips on a print engine queue in preparation for passage thereof to said print engine.

3. The method as recited in claim 1, wherein each page strip is marked in accord with a color plane whose data is controlling during said rasterization and steps f) and g) examine each page strip, after rasterization, to determine a color plane that is to be printed by said print engine.

4. The method as recited in claim 1, wherein step e) further performs a page strip buffer assigning action wherein a page strip buffer used during rasterization of an (N–(X–1))th page strip listed in step a) is assigned to a first page strip listed during step e) and further assigning each page strip buffer that is released after rasterization of a remaining ones of the X–1 page strips listed in step a) to page strips listed in step e).

5. A memory media for controlling a processor to control a printer to overlap the processing of color plane image data, said color plane image data segmented into N page strips that are, in turn, listed on a display list, wherein each page strip entry on said display list includes data defining color(s) to be applied to each object in said each page strip, said printer further having a print engine and X page strip buffers, where X<N, said memory media comprising:

a) means for controlling said processor to list on an imaging queue, said N page strips from said display list, for rasterization in accord with a first color plane data;

b) means for controlling said processor to set a first parameter to indicate that page strips are being rasterized in accord with first color plane data;

c) means for controlling said processor to rasterize page strips from said imaging queue in accord with said first color plane data and to cause rasterized ones of said page strips to be passed to said print engine;

d) means for controlling said processor to set a second parameter to indicate that a page strip rasterized in accord with said first color plane data is being passed to said print engine;

e) means for controlling said processor to list on said imaging queue page strips from said display list for rasterization in accord with a second color plane data and to cause means c) and d) to repeat their actions with respect thereto;

f) means for controlling said processor to transfer rasterized ones of said page strips, listed on said imaging queue in step e), to a work ahead queue when said first parameter and second parameter indicate a different color plane; and g) means for controlling said processor to cause said work ahead queue to pass rasterized page strips to said print engine when said first parameter and second parameter indicate a same color plane.

6. The memory media as recited in claim 5, wherein means d) controls said processor to list rasterized ones of said page strips on a print engine queue in preparation for passage thereof to said print engine.

7. The memory media as recited in claim 5, wherein each page strip is marked in accord with a color plane whose data is controlling during said rasterization and means f) and g) control said processor to examine each page strip, after rasterization, to determine a color plane that is to be printed by said print engine.

8. The memory media as recited in claim 5, wherein means e) further controls said processor to perform a page strip buffer assigning action wherein a page strip buffer used during rasterization of an (N−(X−1))th page strip listed under control of means a) is assigned to a first page strip listed under control of means b) and further assigns each page strip buffer that is released after rasterization of a remaining ones of the X−1 page strips listed under control of means a) to page strips listed under control of means e).

* * * * *